United States Patent
Yamaji et al.

(10) Patent No.: US 7,333,314 B2
(45) Date of Patent: Feb. 19, 2008

(54) POWER CONTROLLER, POWER CONTROL METHOD, INFORMATION PROCESSOR, AND POWER CONTROL PROGRAM

(75) Inventors: Hidenori Yamaji, Tokyo (JP); Soichi Sato, Tokyo (JP); Yoshitaka Narukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 503 days.

(21) Appl. No.: 10/472,956

(22) PCT Filed: Jan. 22, 2003

(86) PCT No.: PCT/JP03/00535

§ 371 (c)(1),
(2), (4) Date: Sep. 26, 2003

(87) PCT Pub. No.: WO03/065493

PCT Pub. Date: Aug. 7, 2003

(65) Prior Publication Data

US 2004/0104709 A1 Jun. 3, 2004

(30) Foreign Application Priority Data

Jan. 29, 2002 (JP) ............................. 2002-020341

(51) Int. Cl.
*H02H 5/04* (2006.01)
(52) U.S. Cl. ...................................... 361/103
(58) Field of Classification Search .................. 361/103
See application file for complete search history.

(56) References Cited

U.S. PATENT DOCUMENTS

| 5,483,154 A | * | 1/1996 | Chen .................. 324/76.66 |
| 5,511,205 A | * | 4/1996 | Kannan et al. ............ 713/324 |
| 5,721,481 A | * | 2/1998 | Narita et al. .............. 320/111 |
| 5,784,628 A | | 7/1998 | Reneris |
| 5,990,664 A | | 11/1999 | Rahman |
| 6,393,584 B1 | * | 5/2002 | McLaren et al. ............ 714/14 |
| 6,510,400 B1 | | 1/2003 | Moriyama |

FOREIGN PATENT DOCUMENTS

| JP | 10-23678 | 1/1998 |
| JP | 11-109439 | 4/1999 |
| JP | 2000-284862 | 10/2000 |
| TW | 424341 | 3/2001 |

* cited by examiner

Primary Examiner—Michael Sherry
Assistant Examiner—Scott Bauer
(74) *Attorney, Agent, or Firm*—Oblon, Spivak, McClelland, Maier & Neustadt, P.C.

(57) ABSTRACT

A power control unit that can perform preventing a secondary battery from generating heat and preventing power supply from being suddenly shut off. Supply of power from a secondary battery to a system unit is controlled by a power control unit. At this time, the power control unit successively monitors a cell temperature of the secondary battery, and requests the system unit to switch to a power saving mode when the cell temperature exceeds a predetermined alarming temperature which is preset.

8 Claims, 7 Drawing Sheets

FIG. 10

| | | | OPERATING STATE OF FIRST SECONDARY BATTERY | | | |
|---|---|---|---|---|---|---|
| | | | Tbc1>Tbw | | Tbc1<Tbw | |
| | | | C1 > C0 | C1 < C0 | C1 > C0 | C1 < C0 |
| OPERATING STATE OF SECOND SECONDARY BATTERY | Tbc2>Tbw | C2 > C0 | TBH | TBH | USE FIRST SECONDARY BATTERY | TBH / LBH |
| | | C2 < C0 | TBH | TBH | USE FIRST SECONDARY BATTERY | LBH |
| | Tbc2<Tbw | C2 > C0 | USE SECOND SECONDARY BATTERY | USE SECOND SECONDARY BATTERY | MAINTAIN PRESENT STATE | USE SECOND SECONDARY BATTERY |
| | | C2 < C0 | TBH / LBH | LBH | USE FIRST SECONDARY BATTERY | LBH |

POWER CONTROLLER, POWER CONTROL METHOD, INFORMATION PROCESSOR, AND POWER CONTROL PROGRAM

TECHNICAL FIELD

The present invention relates to a power controller which is provided in an apparatus operated by power supplied by a secondary battery, and which controls the power supplied from the secondary battery, and a power control method for controlling the power supplied from the secondary battery, which is provided in the apparatus. Also, the present invention relates to an information processor operated by power supplied by a secondary battery, and a power control program for controlling the power supplied from the secondary battery, which is provided in the information processor.

BACKGROUND ART

In recent years, semiconductor manufacturing technology and compact mounting technology have been rapidly advancing, and reduction in size and weight of various electronic and electric apparatuses has been accordingly remarkable in progress. Such apparatuses include, for example, portable telephones, information terminal apparatuses called PDAs (Personal Digital Assistants), or various computer apparatuses. In addition, reduction in size and weight of portable sound playback apparatuses that play back various types of audio data, and various image-capturing apparatuses as typified by digital video cameras have been remarkably advancing.

Assuming outdoor use as a result of the reduction in size and weight, it is common that the above electronic and electric apparatuses is each provided with a secondary battery used as a power supply. It is required that such a secondary battery have small size and weight, and large capacity. For example, a Li-ion battery, a Ni-MH battery, etc., are used. Also, it is required that the above electronic and electric apparatuses, in particular, notebook personal computers, can be battery-operated for a longer time.

As a sophisticated example, one in which a battery module itself has a built-in control circuit formed by a CPU or the like, as commonly called an intelligent battery, has been proposed. In the intelligent battery, by performing power supply and a charging operation while monitoring states (a battery remaining amount state, a charging/discharging state, etc.) of the secondary battery, accurate remaining-amount calculation and fine power-consumption control can be performed.

In general, in the secondary battery, a phenomenon is found in which it is difficult to continue normal power supply, due to heating of battery cells caused by performing large power discharging when the battery cells deteriorate. Conversely, the above intelligent battery has a mechanism in which, when the temperature of battery cells exceeds a predetermined temperature, power supply from the secondary battery is terminated, thus enabling prevention of abnormal heating of the battery cells which may occur in the conventional secondary battery.

However, there is a problem in that, when the above power-supply termination mechanism operates in an intelligent battery provided in, for example, a computer apparatus, the power supply is suddenly interrupted, thus causing data damage such as loss of the stored content of a memory, and damage to a signal-recorded surface of a hard disk drive.

Also, not only in the computer apparatus, but also in the above mentioned various electronic and electric apparatuses, in many cases, suddenly shutting off power supply may inconvenience a user and may result in serious damage.

Accordingly, the present invention is made in view of the above circumstances of the related art, and an object thereof is to provide a power controller and a power control method in an apparatus operated by power supplied by a secondary battery, the power supply from the secondary battery can be prevented from being suddenly shut off. Also, another object of the present invention is to provide an information processor and a power control program which are able to prevent data damage caused by a sudden shut-off of power supply from the secondary battery.

DISCLOSURE OF THE INVENTION

A power controller of the present invention is a power controller provided in an apparatus operated by power supplied from a secondary battery, said power controller controlling the power supplied from the secondary battery, wherein, when the temperature of battery cells in the secondary battery exceeds a preset temperature, said power controller requests the apparatus to switch to an operation in a power saving mode.

A power control method of the present invention is a power control method for controlling power supplied from a secondary battery provided in an apparatus, wherein the method comprises a cell temperature detecting step for detecting the temperature of battery cells in the secondary battery, and an operating mode control step for, when the temperature detected in said cell temperature detecting step exceeds a preset temperature, requesting the apparatus to switch an operation in a power saving mode.

According to the above-constructed present invention, deterioration in battery life, damages in portions, etc., which are caused by abnormal heating of a secondary battery can be prevented, and user's convenience caused by sudden shutoff of power supply can be solved.

In addition, an information processor of the present invention is an information processor operated by power supplied from a secondary battery, wherein the processor comprises a power control unit which, when the temperature of battery cells in the secondary battery exceeds a preset temperature, requests the apparatus to switch to an operation in a power saving mode.

According to the above-constructed present invention, deterioration in battery life, damages in portions, etc., which are caused by abnormal heating in a secondary battery can be prevented. Also, problems, such as a loss of data in operation, and damage to a signal-recorded surface of a hard disk drive, can be solved.

It is preferable that the information processor further comprises an operating mode switching notification means which, when the information processor is requested to switch to the power saving mode, notifies the user of the request. This enables the information processor to notify the user of switching to the power saving mode. Such operating mode switching notification means specifically include, for example, various display devices such as a CRT (Cathode Ray Tube) or a liquid crystal panel, an interface circuit for driving the various display devices, an arithmetic processing circuit for generating data to be displayed on the screen of the display device, and an image processing circuit. A technique for notifying the user is not limited to displaying a message or an icon on the screen of the display device. For example, the user may be notified, for example, by outputting sound, and controlling a dedicated indicator to light on.

In addition, in one specific example of switching to the power saving mode, the power control unit may request an operation program being executed by the information processor to switch to a standby state or a hibernate state. Here, the standby state is that, by stopping power supply to devices consuming a lot of power, such as, for example, the display device and the hard disk drive, minimum power is supplied only to the devices required to restart the operation, such as a RAM (Random Access Memory) storing various types of data. The hibernate state means that, after the data required to restart the operation, which is stored in a volatile memory, is temporarily written in a storage unit such as the hard disk drive, power supply to all the devices is stopped excluding minimum necessary circuits.

When further power supply from a secondary battery which is presently supplying power reaches a limit, and another secondary battery capable of supplying power exists, the power control unit may switch power supply to each portion to be supplied from the secondary battery capable of supplying power. Therefore, when the information processor includes a plurality of secondary batteries, even after power supply from one secondary battery reaches a limit, the operation can be continued by supplying power from another usable secondary battery.

The power control unit may switch the information processor to a power saving mode by outputting a signal indicating that the state of another device provided in the information processor satisfies a condition of switch to the power saving mode. Specifically, for example, when the information processor includes a mechanism that switches to the power saving mode when the temperature of an arithmetic unit provided in the information processor reaches a predetermined temperature, the power control unit outputs, to the information processor, a false report indicating that the temperature of the arithmetic unit satisfies a condition of switching the power saving mode, the need to provide a new mechanism for switching to the power saving mode can be eliminated. A device to which the power control unit sends a false report indicating that the switching condition is satisfied is not limited to the arithmetic unit, but may be, for example, a temperature sensor for measuring a temperature inside a housing forming the information processor.

A power control program of the present invention is a power control program for controlling power supplied from a secondary battery provided in an information processor, wherein the program executes a cell temperature detecting process for detecting the temperature of battery cells in the secondary battery, and an operating mode control process for, when the temperature detected in said cell temperature detecting process exceeds a preset temperature, requesting a predetermined part of the information processor to switch to an operation in a power saving mode.

By executing the power control program according to the above-constructed present invention, when the information processor is used, deterioration in battery life and damages in portions which are caused by abnormal heating of a secondary battery can be prevented. Also, problems, such as a loss of data in operation and damages to a signal recorded surface of a hard disk drive, which are caused by sudden shutoff of power supply, can be solved.

BRIEF DESCRIPTION OF THE DRAWINGS

FIG. 10 is an illustration of power-control determination processing in the above computer apparatus, and is a table summarizing processes performed in accordance with the operating state of two provided secondary batteries.

BEST MODE FOR CARRYING OUT THE INVENTION

Embodiments of the present invention are fully described below with reference to the drawings.

Figure 1:
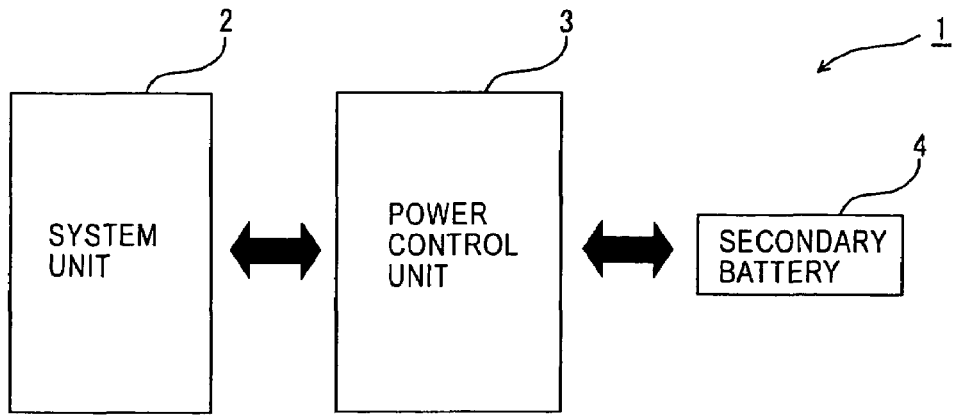
FIG. 1 is a block diagram illustrating an outline of the present invention.

The present invention can be widely applied to various electronic and electric apparatuses operated by power supplied by secondary batteries. Accordingly, first, an overall outline of the present invention is described below with reference to the electronic apparatus 1 shown in FIG. 1. FIG. 1 shows an example of an application of the present invention to a common electric apparatus using a secondary battery as a power supply, and is a schematic block diagram showing each portion for each implemented function.

The electronic apparatus 1 includes, as shown in FIG. 1, a system unit 2 for enabling main functions of the apparatus, a power control unit 3 for controlling the supply of power which is necessary for the operation of the system unit 2, and a secondary battery 4 provided as a power supply for the apparatus.

The system unit 2 includes various apparatuses operated by consuming the power supplied by the secondary battery 4. Such devices include, for example, electric motors, electric heaters, various semiconductor elements, various electric and electronic elements, actuators, or various display devices typified by CRT (Cathode Ray Tube) and liquid crystal panels.

The secondary battery 4 is a battery that can repeatedly charge and discharge, and is specifically, for example, a Li-ion battery, a Ni-MH battery, or the like. When the secondary battery 4 is charged, an external power supply, which is not shown, is connected to the secondary battery 4, and power is supplied from the external power supply to the secondary battery 4. This charging operation may be performed, with the secondary battery 4 still loaded into the electronic apparatus 1. Alternatively, the secondary battery 4 can be removably loaded into the electronic apparatus 1, and the charging operation may be performed, with the secondary battery 4 loaded into another charger separated from the electronic apparatus 1.

The power control unit 3 is provided between the system unit 2 and the secondary battery 4, and controls the power supplied from the system unit 2 to the system unit 2. The power control unit 3 is formed by a combination of, for example, various electric and electronic elements and various semiconductor chips.

A power control technique in the power control unit 3 may be realized in the form of hardware by using electronic and electric circuits, and mechanical switches, etc., or may be realized in a so-called software by a software program describing the operations of semiconductor chips. Although this embodiment employs a configuration in which the power supplied from the system unit 2 is controlled by the power control unit 3 provided separately from the secondary battery 4, for example, a configuration can be employed in which the secondary battery 4 is directly connected to the system unit 2 and the software program executed by the system unit 2 realizes a function corresponding to the power control unit 3 in this embodiment.

Also, the power control unit 3 has a function of detecting the temperature (cell temperature) of battery cells in the secondary battery 4, and requests the system unit 2 to change to a power saving mode when the detected cell temperature exceeds a predetermined temperature which is preset.

The secondary battery 4 has a feature in which, when it discharges a large amount of power, with the battery cells deteriorated, the battery cells generate excessive heat, so that the battery cells are damaged to disable the subsequent charging/discharging. Accordingly, by performing the power supply based on, particularly, the temperature of the battery cells in the secondary battery 4, the power control unit 3 can achieve extension of the life of the secondary battery 4. In addition, the battery body and each portion of the electronic apparatus 1 can be prevented from having deformation and damage caused by excessive heating of the battery cells.

The system unit 2 in the electronic apparatus 1 can switch between a normal operation mode in which the electronic apparatus 1 is operated by sufficiently consuming the required power, and a power saving mode in which the electronic apparatus 1 is operated by power which is less than that in the normal operation mode, and can operate by switching from the normal operation mode to the power saving mode when being requested by the power control unit 3. Here, specific examples of the operation in the power saving mode include, for example, lowering the number of revolutions of an electric motor provided in the system unit 2 than that in the normal operation mode, stopping part of the devices provided in the system unit 2, and setting low operating clocks of semiconductor chips such as a CPU. Alternatively, for example, by controlling a device such as a CPU to intermittently operate (throttling), power consumed by the device may be reduced.

Also, in the electronic apparatus 1, before the battery cells in the secondary battery 4 generate excessive heat, the power control unit 3 can request the system unit 2 to switch to the power saving mode. This reduces the power consumption, thus resulting in suppression in the heat of the secondary battery 4. Accordingly, in the secondary battery 4, the cell temperature gradually decreases to a normal temperature. Therefore, even if the secondary battery 4 is of a type in which it is a so-called intelligent battery and shuts off the supply of power when the cell temperature indicates an abnormal value, the power supply from the secondary battery 4 can be prevented from being suddenly shut off, thus enabling operation in the power saving mode. This can dissolve inconvenience of the user which is caused by a sudden, complete shutoff of the power supply from the secondary battery 4.

The power control unit 3 may be provided in the body of the electronic apparatus 1 including the system unit 2, or may be provided on the battery portion side including the secondary battery 4, and the battery portion, which includes the secondary battery 4 and the power control unit 3, may be removably loaded into the body of the electronic apparatus 1.

Next, in the following, various embodiments of an application of the present invention to a notebook personal computer (hereinafter referred to simply as a computer apparatus) are sequentially described as more specific cases of the above description. In the following, the determination that "the power supply from the secondary battery has reached a limit" is described by exemplifying a case in which the termination is performed based on the temperature of the battery cells in the secondary battery.

FIRST EMBODIMENT

Figure 2:
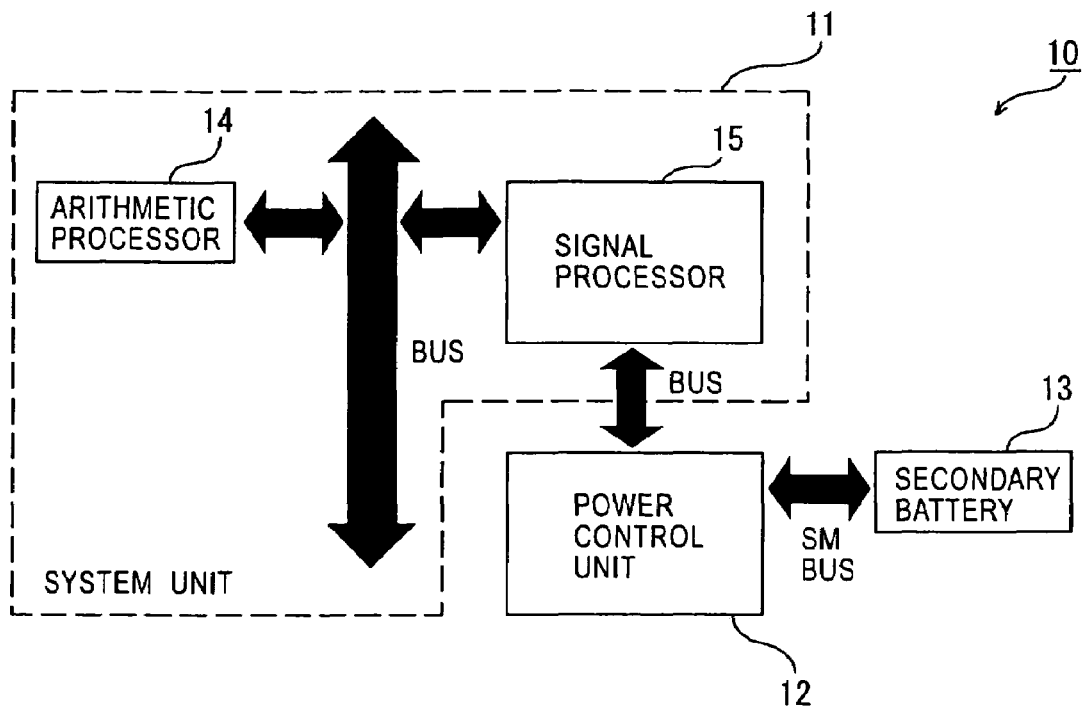
FIG. 2 is a system block diagram showing a computer apparatus as a first embodiment of the present invention.

The computer apparatus 10 shown in FIG. 2 is described as a first embodiment. The computer apparatus 10 includes a system unit 11 corresponding to the system unit 2 in the above electronic apparatus 1, a power control unit 12 corresponding to the power control unit 3 in the electronic apparatus 1, and a secondary battery 13 corresponding to the secondary battery 4 in the electronic apparatus 1, as shown in FIG. 2.

In the system unit 11, an arithmetic processor 14 including a CPU (Central Processing Unit) and a signal passing circuit referred to as a so-called Northbridge, and a signal processor 15 including a signal passing circuit referred to as a Southbridge are connected to each other by a bus such as, for example, a PCI (Peripheral Component Interconnect) bus.

Also, the system unit 11 includes various semiconductor memories such as a RAM (Random Access Memory) and a ROM (Read Only Memory), a hard disk drive for recording/playing back information on a magnetic disk, and an optical disk drive for recording/playing back information on an optical disk, where their illustrations are omitted. The system unit 11 further includes input devices such as a keyboard and a mouse, a display device such as a liquid crystal panel, and an input/output interface for signal input/output with these devices, where their illustrations are omitted.

In addition, the power control unit 12 is connected to the signal processor 15 by, for example, a bus, whereby it is connected to the system unit 11, and control power supplied from a secondary battery 13 to the system unit 11. In this embodiment, it is assumed that an embedded control chip (EC: Embedded Controller) provided in the computer apparatus 10, and its peripheral circuits realize the functions of the power control unit 12.

The secondary battery 13 is connected to the power control unit 12 by, for example, a system management bus [SMBus (trademark of Intel Corporation in the United States)], and functions as a power supply that supplies the power required for the operation of each portion constituting the computer apparatus 10.

The computer apparatus 10 can be battery-operated by the power supplied from the secondary battery 13 provided in the apparatus body, while, when an external AC power supply is connected to it, it can be operated also by power supplied from the AC power supply.

Next, in the following, the actual power control realized in the above-structured computer apparatus 10 is described by paying attention to the operation of the power control unit 12, with reference to the flowchart shown in FIG. 3.

The power control unit 12 starts to operate, for example, when the secondary battery 13 is connected. In step S11 shown in FIG. 3, the power control unit 12 detects the temperature (cell temperature) of the battery cells in the secondary battery 13 by exchanging electric signals with a cell temperature detecting mechanism provided, for example, on the battery side.

Next, in step S12, the power control unit 12 determines whether or not the cell temperature detected in step S11 has exceeded a predetermined temperature (hereinafter referred to as an alarming temperature) which is preset. As a result of this determination, when the cell temperature has exceeded the alarming temperature, the process proceeds to step S13, and when the corresponding to is not greater than the alarming temperature, the processing in step S11 and thereafter are repeatedly performed.

Figure 3:
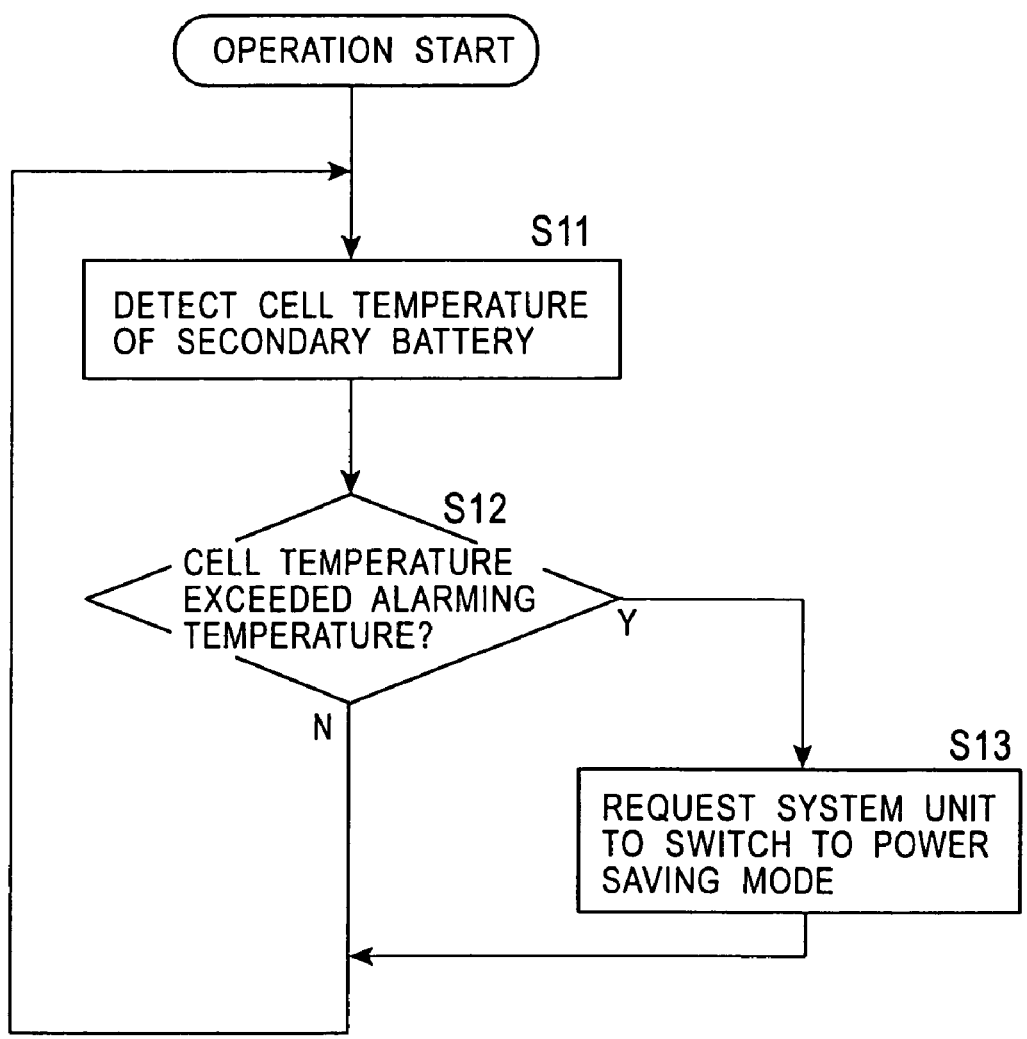
FIG. 3 is a flowchart showing an example of a power control process in the above computer apparatus.

Here, the power control unit 12 repeatedly performs the consecutive process shown in FIG. 3 at predetermined time intervals separately from another process, and performs detection of the operating state (the cell temperature in this embodiment) of the secondary battery asynchronously with another process. In other words, in this embodiment, the power control unit 12 performs polling on detection of the cell temperature of the secondary battery 13. However, the cell temperature detection in step S11 is not limited to polling by the power control unit 12, but the determination process in step S12 may be performed at the time the present cell temperature is input to the power control unit 12 after the cell temperature is output form the cell temperature detecting mechanism provided in the secondary battery 13 to the power control unit 12.

Also, the value of the alarming temperature which is used in the determination in step S12 may be stored beforehand, for example, in a predetermined area in an embedded control chip realizing the functions of the power control unit 12, or may be directly written in a software program describing the operation of the embedded control chip. The value of the alarming temperature may also be stored so that it cannot be changed, or may be externally changed, if needed.

In addition, in step S13, at the time the cell temperature of the secondary battery 13 has exceeded the alarming temperature, the power control unit 12 request the system unit 11 to switch to the power saving mode, regarding a condition for switching to the power saving mode as being satisfied. After that, the process returns to step S11, and the power control unit 12 repeats the consecutive process. At this time, processing that requests switching to the power-supply wiring in step S13 may be performed only once until the system is reset, such as restarting of the computer apparatus 10, or may be repeatedly performed until the cell temperature of the secondary battery 13 decreases to the alarming temperature or less.

Here, the output direction of the request for switching to the power saving mode, which is output from the power control unit 12, includes, for example, an operation system (OS) which is mainly executed by the arithmetic processor 14 (CPU) and which performs overall control of the entirety of the system unit 11, or an application program executed on the OS, and various utility programs.

Figure 4:
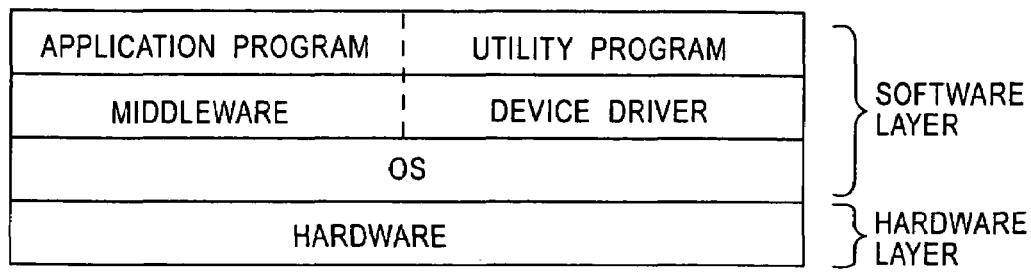
FIG. 4 is a schematic illustration of a hierarchical structure of hardware and software in the above computer apparatus.

In the computer apparatus 10, hardware and software cooperatively operate in a hierarchical structure as shown in FIG. 4, whereby they function as a whole. In other words, the computer apparatus 10 consists of a hardware layer including the arithmetic processor 14 and the signal processor 15, which include a CPU and a memory, or a hard disk drive and a keyboard, and a software layer that control the operation of each portion in the hardware layer. The software layer includes an OS for performing overall control of the operation of the entirety of the computer apparatus 10, a plurality of device drivers for controlling various devices in a dedicated manner, middleware which is higher in level than the OS and which provides specific functions, and an application program and an utility program which provide specific function by using functions provided by the OS and middleware.

Accordingly, the power control unit 12 outputs a message that requests switching to the power saving mode, to the above OS, or a utility program is executed in a resident form and which monitors the state of the secondary battery 13. After that, the OS, which receives this message, controls the entire system of the computer apparatus 10 to switch to the power saving mode. When this message is output to the utility program, at the time the utility program receives the message, the OS is requested to switch to the power saving mode, and the OS switches the entire system to the power saving mode.

Here, the power control unit 12 may request switching to the power saving mode by outputting a dedicated message prepared for controlling the power supplied from the secondary battery 13. However, for example, when a message for switching to the power saving mode is prepared beforehand in the system unit 11 such as an OS, switching to the power saving mode may be requested by outputting a message equivalent to the above. Regarding the prepared message, for example, Windows (registered trademark), which is an OS of Microsoft Corporation in the United States, includes a predetermined scan code (E05F) for switching to a system sleep process. Also, a message equivalent to a message generated when switching to the power-supply wiring may be output such that, for example, the user operates a power button or sleep button provided on the computer apparatus 10.

Here, the power saving mode is particularly not limited if it is an operating mode in which power consumption is lower than that in the normal operating mode. Examples of the power saving mode includes switching to a so-called standby state and hibernate state.

The standby state is a state in which the computer apparatus 10 is operated by power consumption lower than that in the normal mode by, among the components constituting the computer apparatus 10, stopping the operations of relatively-large-power-consumption devices such as, for example, the CPU, the hard disk drive, and a display device, and deliberately decreasing the operating speed. Recovering from the standby state to the normal state is performed, for example, by the following. Specifically, when a recovering event is generated by operating the keyboard or the mouse and pressing the power button by the user, the embedded control chip (EC) detects the recovering event, and requests the system unit 11 to recover from the standby state. The operation system (OS) executed by the system unit 11 sends a message that directs each device to recover the operating state. This controls the device to recover to the normal state. Also, in a hibernate state, data existing in the memory area of the computer apparatus 10, the information required for reproducing the present operating environments, etc., are written in nonvolatile memories such as the hard disk drive, and power other than the minimum required power such as standby power is all shut off. Recovering from the hibernate state to the normal state is performed such that, after each portion of the computer apparatus 10 is supplied with power, the data and information written in the hard disk drive are read and the last operating environments are reproduced. In the hibernate state, the power consumption can be reduced than that in the standby state because almost all the power is shut off. The hibernate state is, in general, also called the suspend state, the dormant state, or the resting state.

Switching to the power saving mode is not limited to control of the entire system to switch to the standby state or the hibernate state, as described above. However, each device may be separately controlled to switch to the power saving mode, such as reducing the brightness of a backlight in the liquid crystal panel provided as the display device.

The power control unit 12 operates as described above, whereby, when the battery cells in the secondary battery 13 have a temperature greater than the alarming temperature, the computer apparatus 10 switches to the power saving mode and can reduce the power consumption. Accordingly, the heating by the secondary battery 13 is reduced, so that the cell temperature of the secondary battery 13 gradually decreases to the normal temperature. Thus, by preventing battery cell deterioration caused by an abnormal rise in the cell temperature of the secondary battery 13, the extension of the life of the secondary battery 13 can be achieved, and accidents can be prevented in which the heating may deform each portion of the computer apparatus 10, and may burn the user.

In addition, even if the secondary battery 4 is of a type in which it is, for example, a so-called intelligent battery and shuts off the supply of power when the cell temperature indicates an abnormal value, by setting a temperature lower than a temperature which is set as an "abnormal temperature" by the intelligent battery, as an "alarming temperature" in the power control unit 12, a power shutoff operation in the intelligent battery can be prevented. Therefore, a loss of data can be prevented which is caused by sudden shutoff of the power supply.

Although the computer apparatus 10 can immediately switch to the power saving mode at the time it is requested to switch to the power saving mode by the power control unit 12, it is preferable that, for example, by displaying a predetermined message or an icon on the screen of the display device, which is formed by a CRT or a liquid crystal panel, the user be notified of switching to the power saving mode. For example, this can prompt the user to quickly end the required operation, and to connect the external AC power supply.

The above process for notifying the user may be realized by an operation system (OS), or may be realized by a dedicated utility program which is executed on the OS and which is specialized for a function of notifying the user of information concerning power control.

Figure 5:
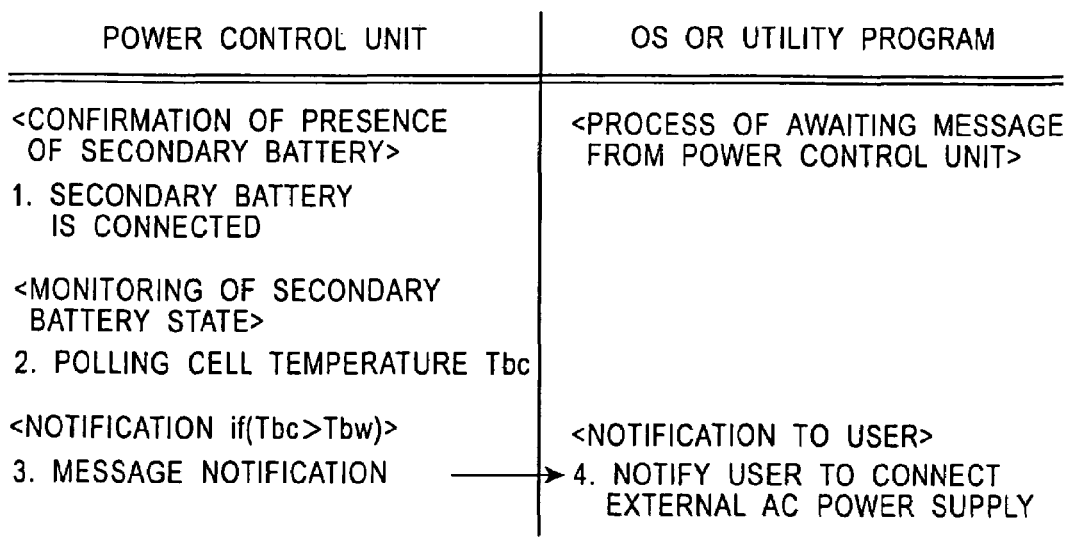
FIG. 5 is a schematic illustration illustrating a process of notification to the user of the above computer apparatus.

This notifying process is realized by the procedure shown in FIG. 5. As FIG. 5 shows, after determining whether or not the secondary battery 13 is connected, the power control unit 12 performs occasional detection (polling) of cell temperature Tbc of the secondary battery 13. When the cell temperature Tbc exceeds a preset alarming temperature Tbw, the power control unit 12 outputs, to the OS or the utility program, a message or signal representing that.

In addition, regarding the operation of the OS or utility program, as shown in FIG. 5, when the OS or utility program receives the message in awaiting the message output from the power control unit 12, it displays, on the screen of the display device, a window that notifies the user that the cell temperature Tbc has exceeded the alarming temperature Tbw. The window displayed at this time may display, for example, "CONNECT EXTERNAL AC POWER SUPPLY" or "BATTERY TEMPERATURE IS INCREASING".

A technique for notifying the user is not limited to displaying of a message or an icon on the screen of the display device, but the user may be notified, for example, by outputting audio, or controlling a dedicated indicator to light up.

Also, although this embodiment describes that the power control unit 12 determines whether or not the cell temperature Tbc of the secondary battery 13 exceeds the alarming temperature Tbw, the determination is not limited to implementation by the power control unit 12, but may be realized, for example, by an OS or a software program such as a utility program executed on the OS. In this case, the power control unit 12 may have a function of passing the cell temperature Tbc of the secondary battery 13 to a program which performs the determination. Also, in this case, the cell temperature Tbc may be sent from the power control unit 12 to the program at predetermined time intervals, and the present cell temperature Tbc may be passed from the power control unit 12 to the program in response to each request from the program.

In the above description, when the cell temperature Tbc of the secondary battery 13 exceeds the predetermined alarming temperature Tbw, which is preset, switching to the power saving mode is requested and the user is notified. However, a plurality of gradual alarming temperatures may be set.

In this case, for example, at the time the cell temperature Tbc exceeds a first alarming temperature Tbw1, a warning is given to the user by displaying the message "BATTERY TEMPERATURE IS INCREASING", or the like, on the screen of the display device. Also, at the time the cell temperature Tbc exceeds a second alarming temperature Tbw which is higher than the first alarming temperature Twb1, by displaying the message "CONNECT EXTERNAL AC POWER SUPPLY" or the like on the screen of the display device, the user is requested to connect the AC power supply, and at the time the cell temperature Tbc exceeds third alarming temperature Tbw which is higher than the second alarming temperature Tbw2, the system of the computer apparatus 10 is switched to the power saving mode.

In the computer apparatus 10, as described above, by setting a plurality of gradual alarming temperatures, and performing a different operation at the time the cell temperature Tbc exceeds each alarming temperature, for example, the user can be gradually notified that switching to the power saving mode is close, thus enabling an improvement in the user's convenience.

In addition, notebook personal computers in recent years have a feature in that a peak of power consumption is very higher than average power consumption. Accordingly, it is required that a secondary battery having discharging characteristics which sufficiently satisfy the peak of power consumption be provided. In the case of notebook personal computers, their small size and weight cause big commercial value, so that the set volume has a limitation, and it may be difficult to load a secondary battery having sufficient discharging characteristics.

Nevertheless, since the above computer apparatus 10 includes the power control unit 12, if a secondary battery having such discharging characteristics that cope with power consumption in normal use is loaded, the power control unit 12 functions at the peak of power consumption, whereby the power consumption of the entire system can be automatically reduced. In other words, since the power control unit 12 functions as a so-called safety mechanism, if a small and light secondary battery coping with the power consumption in normal use is loaded, the secondary battery can be prevented from abnormally generating heat at the peak of power consumption, and a possibility of data loss caused by a sudden shutoff of power supply can be prevented. Therefore, a notebook personal computer which is small and light as a whole is realized.

SECOND EMBODIMENT

Figure 6:
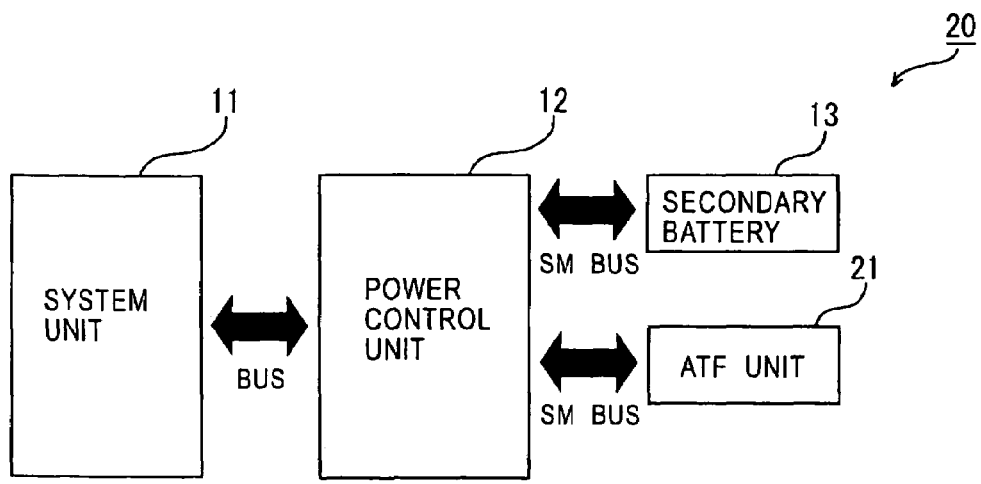
FIG. 6 is a system block diagram of a computer apparatus as a second embodiment of the present invention.

Next, the computer apparatus 20 shown in FIG. 6 is described as a second embodiment of the present invention. Compared with the computer apparatus 10 according to the above first embodiment, the computer apparatus 20 greatly differs in that, as shown in FIG. 6, an ATF unit 21 is connected to the power control unit 12, and has other portions identical or equivalent in configuration to the computer apparatus 10. Accordingly, in this embodiment, a description of the portions identical or equivalent to the above first embodiment is omitted, and they are denoted by identical reference numerals in the figure.

Embodiments, which are exemplified and described later, can be made identical or equivalent in configuration to the computer apparatus 10 according to the above first embodiment. Accordingly, in the embodiments, a description of the portions identical or equivalent to the above first embodiment is omitted, and they are denoted by identical reference numerals in the figure.

The ATF (Active Thermal Feedback) unit 21 provided in the computer apparatus 20 is a device which is connected to the power control unit 12 by a system management bus (SMBus), and which has a function of monitoring the temperature of a CPU provided in a system unit 11. The AFT unit 21 detects the temperature of the CPU and notifies a power control unit 12 of the temperature.

In this embodiment, it is assumed that the computer apparatus 20 has a basic structure designed in accordance with a standard called the ACPI (Advanced Configuration & Power Interface) established in cooperation by Intel Corporation in the United State, Microsoft Corporation in the United State, Toshiba Corporation, etc. In the ACPI, a mechanism is implemented in which, when the temperature of the CPU reaches a preset alarming temperature, power consumption is lowered by decreasing the operating clocks of the CPU in order to prevent the CPU from being damaged by heat generated by the CPU itself.

In this embodiment, when the cell temperature of the secondary battery 13 exceeds a predetermined temperature, an abnormal rise in the temperature of the secondary battery 13 can be prevented such that the power control unit 12 uses the ACPI mechanism to lower the power consumption of the CPU. More specifically, as is described below, the above is realized such that the power control unit 12 performs, in parallel, a process for monitoring the cell temperature of the secondary battery 13 and a process for monitoring the temperature of the CPU in accordance with the ACPI standard.

In other words, in a consecutive process for monitoring the cell temperature of the secondary battery 13, the power control unit 12 confirms whether or not the secondary battery 13 is connected, and uses asynchronous processing to perform detection (polling) of the cell temperature Tbc of the secondary battery 13 when the secondary battery 13 is connected. When the detected cell temperature Tbc exceeds predetermined alarming temperature Tbw which is preset, a predetermined flag representing this state is turned on. Also, when the detected cell temperature Tbc decreases below the alarming temperature Tbw, the flag is turned off. This type of flag may be realized by inverting a bit at a predetermined address in a semiconductor memory provided in the power control unit 12.

Alternatively, in the consecutive process for monitoring the CPU temperature of the secondary battery, when the CPU temperature Tcc detected by the AFT unit 21 exceeds predetermined temperature (alarming temperature) Tcw, the power control unit 12 outputs, to the system unit 11, a request to lower the operating clock of the CPU. When the CPU temperature Tcc exceeds predetermined temperature (shut-down temperature) Tce which is preset, the power control unit 12 outputs, to the system unit 11, a request to control the system unit 11 to functionally terminate (shut down). The power control unit 12 also refers to the flag used in the consecutive process for monitoring the cell temperature, and resets, when the flag is on and Tcc<Tce, the value Tcc of the CPU temperature to a value satisfying Tcw<Tcc<Tce.

In other words, in this embodiment, when the cell temperature of the secondary battery 13 exceeds the alarming temperature, the power control unit 12 can lower the power consumption of the CPU by outputting, to the system unit 11, a request pretending that the CPU temperature has exceeded the alarming temperature. Such a decrease in the power consumption of the CPU lowers the power discharged by the secondary battery 13, thus suppressing the heat generated by the secondary battery 13.

As in this embodiment, in the computer apparatus 20, which includes a mechanism for controlling power consumption, which is realized by, for example, the ACPI, by employing a structure in which, when the cell temperature of the secondary battery 13 exceeds the alarming temperature Tbw, the power consumption of the entirety of the computer apparatus 20 is lowered, the need to provide a new mechanism for switching to the power saving mode can be eliminated, and a system that can effectively prevent abnormally generated heat of the secondary battery 13 and sudden termination of power supply is realized with a low cost.

THIRD EMBODIMENT

Figure 7:
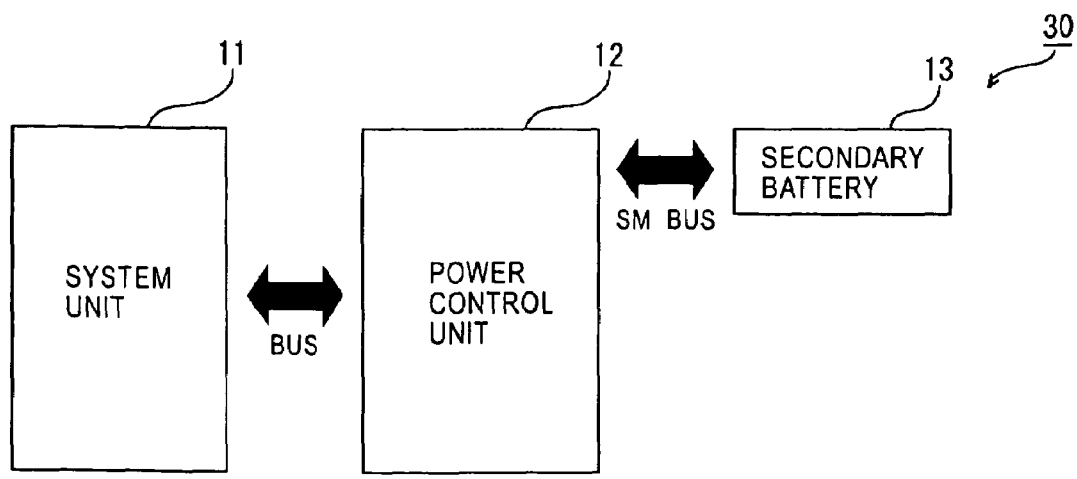
FIG. 7 is a system block diagram of a computer apparatus as a third embodiment of the present invention.

Next, the computer apparatus 30 shown in FIG. 7 is described as a third embodiment. The computer apparatus 30 is similar in configuration to the computer apparatus 10 shown as the first embodiment, as shown in FIG. 7.

In this embodiment, it is assumed that the computer apparatus 30 has a basic structure designed in accordance with the ACPI standard described in the second embodiment. The computer apparatus 30 is provided with a mechanism that switches to the power saving mode when the remaining amount of power of the secondary battery 13 decreases. Such a mechanism is provided in many computer apparatuses used in recent years, and it is premised that a BIOS (Basic Input Output System) and an operation system (OS) which are provided in the system unit 11 accept the mechanism.

This embodiment has a difference from the computer apparatus 20 described in the second embodiment in that what is spuriously reported by the power control unit 12 is not the CPU temperature but the remaining amount of power of the secondary battery 13.

The computer apparatus 30 performs, in parallel, in the power control unit 12, a process for monitoring the cell temperature of the secondary battery 13 similarly to the ace of the computer apparatus 20, and a process for monitoring, based on the ACPI standard, the remaining amount of power of the secondary battery 13.

In a consecutive process for monitoring the remaining amount of power of the secondary battery, whenever a predetermined time passes, the power control unit 12 detects the remaining amount of power of the secondary battery 13, and writes value C representing the remaining amount of power in a predetermined memory area which is set beforehand.

Also, the system unit 11 occasionally refers to the value C, and performs switching to the power saving mode such as the standby state or the hibernate state when the value C lowers than alarming remaining amount Cw.

The power control unit 12 also refers to the flag which is used to monitor the cell temperature of the secondary battery 13, and writes not the original value C of the battery remaining amount but value C' in which C'<Cw in the predetermined memory area when the flag is on.

In other words, in this embodiment, when the cell temperature Tbc of the secondary battery 13 exceeds the predetermined alarming temperature Tbw, the power control unit 12 deliberately falsifies the value C of the battery remaining amount, whereby the system unit 11 can be requested to switch to the power saving mode.

As in this embodiment, when the computer apparatus 30 is provided with the mechanism for controlling the system to switch to the power saving mode in accordance with the remaining amount of power of the secondary battery 13, the power control unit 12 reports a falsified remaining amount of battery to the system, whereby the cell temperature of the secondary battery 13 can be prevented from abnormally rising. This enables an effective application of the present invention without making new changes to a conventionally used BIOS or OS.

Although, in the above description, a device that falsifies the value C of the remaining amount of battery is the power control unit 12, for example, when the secondary battery 13 is formed as an intelligent battery, the mechanism that spuriously reports the value C of the remaining amount of battery when the cell temperature Tbc exceeds the alarming temperature Tbw can be built into a control circuit provided in the intelligent battery. In this case, the body of the computer apparatus 30 can be equivalent in structure to a conventional computer apparatus complying with the ACPI, and this case has an advantage in that it is not required to alter portions other than the control circuit of the intelligent battery.

FOURTH EMBODIMENT

Figure 8:
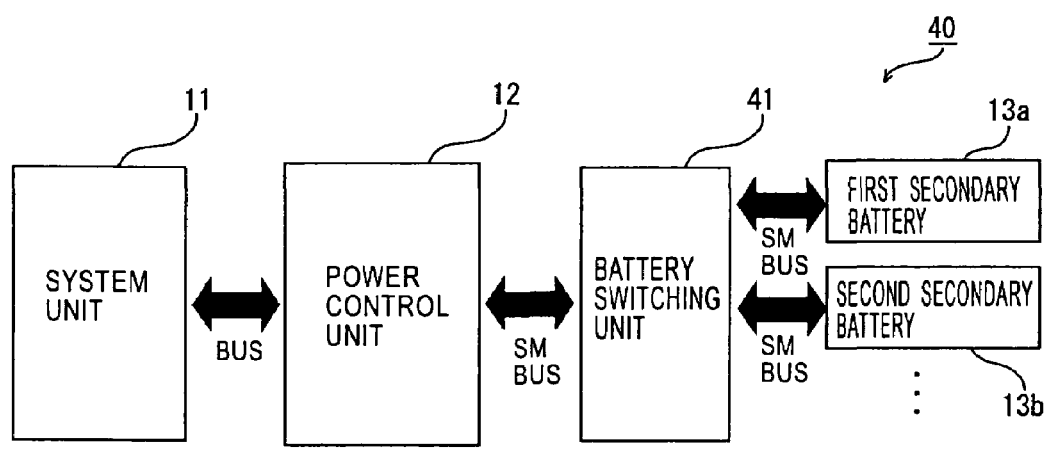
FIG. 8 is a system block diagram of a computer apparatus as a fourth embodiment of the present invention.

Next, the computer apparatus 40 shown in FIG. 8 is described as a fourth embodiment. As shown in FIG. 8, the computer apparatus 40 differs in apparatus configuration from the computer apparatus 10 shown as the first embodiment in that a plurality of secondary batteries are loaded and these secondary batteries 13a and 13b are connected to a power control unit 12 by a battery switching unit 41. This embodiment assumes a case in which two secondary batteries, namely, the first secondary battery 13a and the second secondary battery 13b, are loaded into the computer apparatus 40. However, the number of secondary batteries loaded into the computer apparatus 40 is particularly not limited.

In the computer apparatus 40, system management buses (SMBus) are used to connect each secondary battery 13a or 13b and the battery switching unit 41, and the battery switching unit 41 and the power control unit 12. The battery switching unit 41 has a function of switching between the first secondary battery 13a and the second secondary battery 13b for use in power supply to the system unit 11 in response to a request from the power control unit 12.

The power control unit 12 also detects the cell temperature Tbc1 of the first secondary battery 13a and the cell temperature Tbc2 of the secondary battery 13b, and detects the remaining amount of each battery. Based on the cell temperatures and remaining amount of power of the secondary batteries 13a and 13b, the power control unit 12 controls power supply from each secondary battery.

Figure 9:
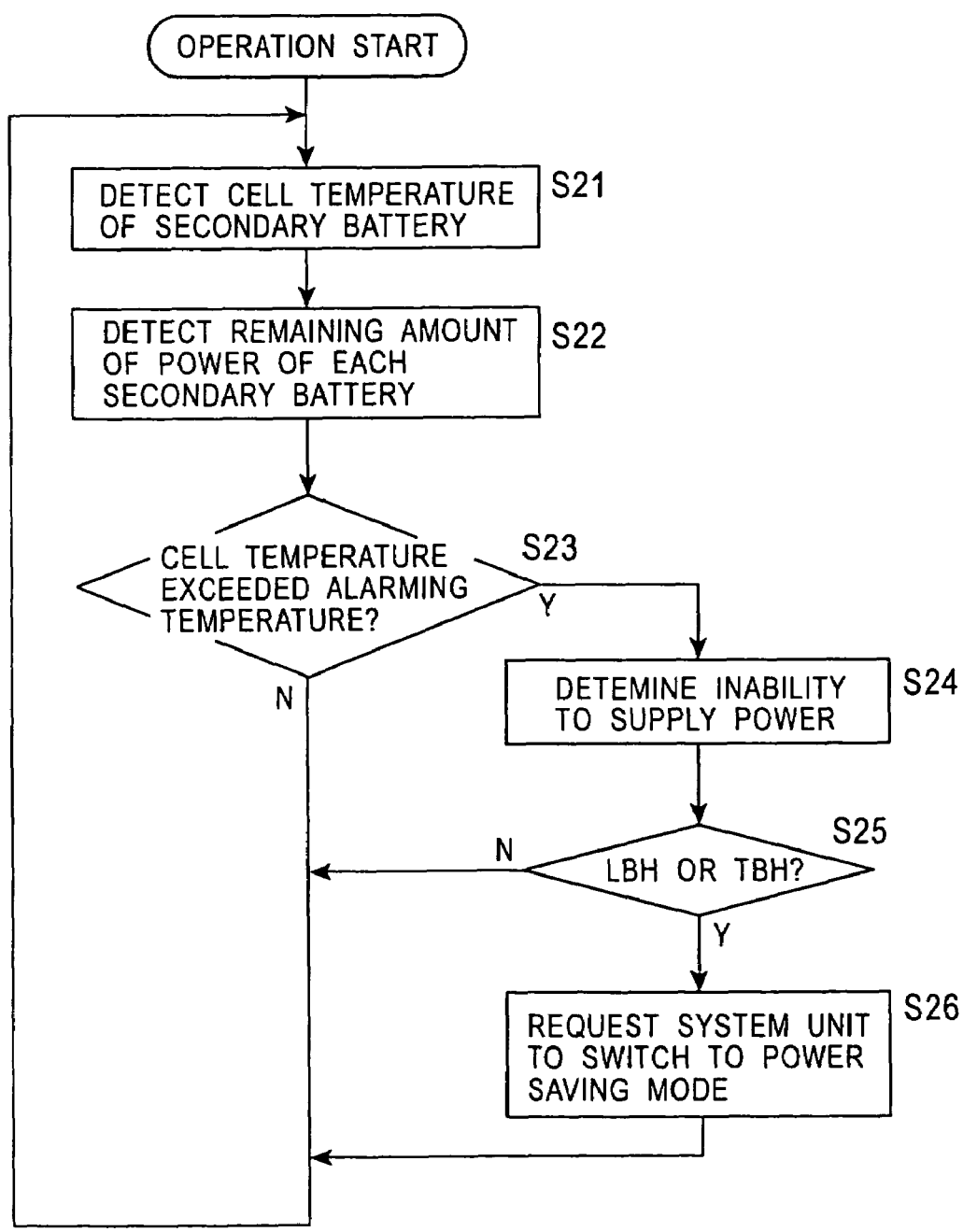
FIG. 9 is a flowchart showing a power control process in the above computer.

Here, in power control processes in the power control unit 12, a process for a case in which the cell temperature exceeds the transistor is noted, and an example of the process is described with reference to the flowchart shown in FIG. 9.

Connecting the first or second secondary battery 13a or 13b starts the operation of the power control unit 12. In the step S21 shown in FIG. 9, the power control unit 12 detects the cell temperature Tbc1 of the first secondary battery 13a and the cell temperature Tbc2 of the second secondary battery 13b. Next, in step S22, the power control unit 12 detects the remaining amount C1 of power of the first secondary battery 13a and the remaining amount C2 of power of the second secondary battery 13b. At this time, a technique for detecting the remaining amount of power may be performed, for example, by sending/receiving electric signals to/from a remaining-amount-of-power detecting mechanism provided on the battery side.

Next, in step S23, the power control unit 12 determines whether or not each of the cell temperatures Tbc1 and Tbc2 detected in step S21 of the secondary batteries 13a and 13b exceeds the alarming temperature Tbw.

As a result of this determination, when the cell temperature exceeds the alarming temperature, the process proceeds to step S24, and when the cell temperature is not greater than the alarming temperature, the process repeatedly performs processing in step S21 and thereafter.

In step S24, in accordance with the operating states (the cell temperature and the remaining amount of power) of each of the secondary batteries 13a and 13b, the power control unit 12 determines whether or not power can be supplied from each of the secondary batteries 13a and 13b while referring to the determination table shown in FIG. 10. Specifically, it performs a determination process based on the condition that each of the cell temperatures Tbc1 and Tbc2 of the secondary batteries 13a and 13b exceeds the alarming temperature Tbw, and the condition that each of the remaining amounts C1 and C2 of power of the secondary batteries 13 is below a limit remaining amount C0 at which it is difficult to supply more power from the secondary batteries.

Here, the determination process in step S24 is specifically described with reference to the determination table shown in FIG. 10.

When the cell temperature Tbc1 of the first secondary battery 13a is less than the alarming temperature Tbw, and the remaining amount C1 of power is greater than the limit remaining amount C0, if the cell temperature Tbc2 of the second secondary battery 13b is greater than the alarming temperature Tbw, or the remaining amount C2 of the second secondary battery 13b is less than the limit remaining amount C0, power supply from the first secondary battery 13a is performed.

When the cell temperature Tbc2 of the second secondary battery 13b is less than the alarming temperature Tbw, and the remaining amount C2 of power is greater than the limit remaining amount C0, if the cell temperature Tbc1 of the first secondary battery 13a exceeds the alarming temperature Tbw, or the remaining amount C1 of the first secondary battery 13a is less than the limit remaining amount C0, power supply from the second secondary battery 13b is performed.

When the determination process produces a result representing power supply from a battery different from the present batteries which supply power, the power control unit 12 requests the battery switching unit 41 to switch a battery for use. Alternatively, when the determination produces a result representing power supply from the same batteries as the present batteries which supply power, the power control unit 12 maintains power supply from the present batteries which supply power without performing particular control processing.

Also, when either of the first secondary battery 13a and the second secondary battery 13b is in a state capable of supplying sufficient power, that is, four conditions represented by Tbc<Tbw, C1>C0, Tbc2<Tbw, and C2>C0 are satisfied, the power control unit 12 maintains power supply from the present batteries which supply power without performing particular control processing.

In addition, in cases other than the above results, that is, when cases are represented by "TBH" and "LBH" in FIG. 10, it is indicated that the computer apparatus 40 needs to switch to the power saving mode since both the first secondary battery 13a and the second secondary battery 13b have limitations in supplying more power. These cases are described in step S25 and thereafter.

After the determination process in the above step S24, in step S25, the power control unit 12 determines whether the determination result is "TBH" or "LBH". When the determination result is neither "TBH" nor "LBH", an operation in accordance with the result of the determination in step S24, and the process returns to step S21 and repeats the above consecutive process. When the determination result is "TBH" or "LBH", the process proceeds to step S26.

In step S26, the power control unit 12 regards the condition of switching to the power saving mode as being satisfied, and requests the system unit 11 to switch to the power saving mode. After that, the power control unit 12 returns to step S21 and repeats the consecutive process. The processing in step S26 is equivalent to the processing in step S13 in FIG. 3. By performing the processing, the computer apparatus 40 switches to the power saving mode.

As described above, in this embodiment, the power control unit 12 realizes control in which, based on two conditions, namely, the cell temperature and remaining amount of power of each secondary battery 13, actually-power-supplying batteries are selectively used and the system is switched to the power saving mode when power supply from either secondary battery is difficult.

Accordingly, even if the cell temperature of a presently-power-supplying battery increases in a state in which both the first secondary battery 13a and the second secondary battery 13b have sufficient remaining amounts of power, the power supply is continued by switching to another secondary battery, and the original secondary battery can be prevented from generating abnormal heat. Also, when the original secondary battery is sufficiently cooled, the secondary battery is used again to supply power.

Conversely, for example, in a conventional intelligent battery, at the time either of the remaining amount and cell temperature of a secondary battery satisfies the condition of terminating discharging of the secondary battery, power supply is immediately shut off. Therefore, if the secondary battery has a lot of remaining amount of power, at the time the cell temperature reaches a predetermined temperature, subsequent supply of power cannot be continued.

Accordingly, the computer apparatus 40 according to this embodiment can use power which is accumulated in the secondary battery more efficiently than conventional, and has an advantage in that it can extend the time of driving by the secondary battery 13.

OTHER EMBODIMENTS

Although the foregoing describes embodiments in the case of applying the present invention to a computer apparatus formed as a notebook personal computer, the present invention may be widely applied to various electronic and electric apparatuses operated by power supplied by secondary batteries. Specifically, for example, the present invention can be applied to portable telephones, information terminal apparatuses called PDA (Persnal Digital Assistant) devices, portable audio playback apparatuses for playing back various types of audio data, or various image capturing apparatuses typified by digital video cameras.

The power control operation in the power control unit 3 or the power control unit 12 can be formed as a software program which is executed by a desired electronic apparatus. Alternatively, such a software program may be provided in a form stored in various recording media.

According to the present invention, deterioration in battery life, damages in portions, etc., which are caused by abnormal heating of a secondary battery can be prevented, and user's convenience caused by sudden shutoff of power supply can be solved.

Therefore, a loss of data and damage and malfunction of an apparatus which are caused by sudden shutoff of power supply can be prevented, whereby the reliability and convenience of an apparatus or information processor operated by a secondary battery can be increased.

The invention claimed is:

1. An information processor operated by power supplied from a secondary battery,
    said information processor comprising a power control unit which, when the temperature of battery cells in the secondary battery exceeds a preset temperature, requests switching to a power saving mode,
    an active thermal feedback unit which monitors a temperature of a CPU is included in said information processor and notifies said power control unit of the monitored temperature, and
    wherein, when the temperature of the battery cells exceeds a temperature at which said information processor is switched to said power saving mode, said power control unit reduces power consumption by setting the temperature of the CPU detected by said active thermal feedback unit to a value greater than the preset temperature.

2. An information processor according to claim 1, further comprising operating-mode-switching notification means which, in a case in which the power control unit requests switching to the power saving mode, notifies a user of the case.

3. An information processor according to claim 1, wherein said power control unit requests an operation program being executed by said information processor to switch to a standby state or a hibernate state.

4. An information processor according to claim 1, wherein, when further power supply from the secondary battery, which is presently supplying power, reaches a limit, and another secondary battery capable of supplying power exists, said power control unit switches supply of power to each portion of said information processor to be supplied from the secondary battery capable of supplying the power.

5. An information processor according to claim 1, wherein said power control unit switches said information processor to the power saving mode by outputting a signal indicating that the state of another device provided in said information processor satisfies a condition of switching to the power saving mode.

6. An information processor according to claim 5, wherein said power control unit switches said information processor to the power saving mode by outputting a signal indicating that the temperature of an arithmetic unit provided in said information processor satisfies the condition of switching to the power saving mode.

7. An information processor according to claim 1, further comprising an operation system which controls said information processor and which switches said information processor to the power saving mode when receiving a request to switch the operation in the power saving mode.

8. An information processor according to claim 1, wherein when the temperature of the battery cells in the secondary battery, which is presently supplying power, exceeds the preset temperature, and also the temperature of battery cells in a secondary battery which is not presently supplying power, exceeds the preset temperature, or the secondary battery which is not presently supplying power is unable to perform power supply, said power control unit requests switching to the operation in the power saving mode.

* * * * *